United States Patent Office 3,239,476
Patented Mar. 8, 1966

3,239,476
SELF-EXTINGUISHING EPOXY OLEORESINOUS
COMPOSITIONS
Alexander M. Partansky, Concord, Calif., assignor to The Dow Chemical Company, Midland, Mich., a corporation of Delaware
No Drawing. Filed Apr. 2, 1962, Ser. No. 184,533
9 Claims. (Cl. 260—19)

The invention concerns a new epoxy resin-based oleoresinous composition which is especially adapted for use in fire-resistant protective coatings.

The composition of the invention is self-extinguishing, i.e., when subjected to A.S.T.M. Test D635–56T, wherein the composition is ignited and the igniting source thereafter removed in accordance with the specifications of the test, the composition ceases to burn. The composition is easily applied as a surface coating and dries rapidly at conveniently available ambient temperatures, such as a room temperature, e.g., between about 15° and 30° C., or can be baked. When the coating films are dried by exposure to air in the presence of the usual paint driers, such as naphthenates of Pb, Co, Mn or Zn, it has good flexibility and resistance to checking and cracking and to attack by corrosive materials and solvents.

Efforts to impart fire resistance to surface coatings in the past have been largely limited to the incorporation therein of certain pigments, e.g., carbonates, borates, and phosphates which decompose when heated forming a fire-resistant foam which in turn protects the combustible substratum from burning. Such coatings, however, do not prevent the spread of surface fires.

The composition of the invention offers the advantage of being self-extinguishing as used and of not requiring the formation of a substance to blanket the surface to be protected. This is particularly important when surface coatings are applied to a non-combustible base, e.g., metal, plaster, or masonry, wherein the prevention of surface fires is sought. This is largely true because known fire-resistant coatings are sacrificial; they are consumed in the process of protecting the underlying material against fire. Such coatings will propagate combustion after flames no longer impinge thereon from an external source. Consequently, such coatings—however otherwise beneficial—interject the hazard of a fire propagation into the art of providing protective coatings to substantially noncombustible surfaces. The composition of the invention provides a coating which both protects the underlying materials against corrosion and the like and also provides a coating which does not propagate flame.

The composition of the invention is essentially an epoxy resin-based oleoresinous composition (hereinafter usually referred to as an oleresinous polyester) suitable for surface coatings consisting of the reaction product of the adduct of an epoxy novolac and a polyhalogenated phenol, and one or a plurality of relatively long carbon chain unsaturated fatty acids. The acid must contain at least 1 olefinic bond per molecule and from 8 to 22 carbon atoms. The ratio of the adduct to the fatty acid may be varied. The higher the proportion of fatty acid, the more flexible is the cured coating film made therefrom. In contrast thereto, the higher the proportion of the epoxy novolac-halogenated phenol adduct, the harder and less flexible is the resulting cured coating. The proportions of halogenated phenol adduct and fatty acid selected should provide enough halogenated phenol adduct to render the oleoresinous polyester self-extinguishing. The percentage by weight of the adduct and the fatty acid employed is usually between 70% and 40% of the adduct and between 30% and 60% of the fatty acid. The preferred percentage by weight is between 65% and 50% of the adduct and between 35% and 50% of the fatty acid. Any bromo- or chlorophenol may be employed as the halophenol in the preparation of the resinous adduct so long as it provides at least about 10% bromine or about 18% chlorine by weight of the final coating vehicles, when the coating film includes no additament, e.g., a pigment, or at least half of these amounts when the coating film also contains auxiliary fire-retardant agents such as $Sb_2O_3$ or the like. When both brominated and chlorinated phenols are employed, a rising intermediate value directly proportional to the percent of chlorine to bromine, may be used.

The epoxy novolac employed to prepare the adduct may be represented by the following formula:

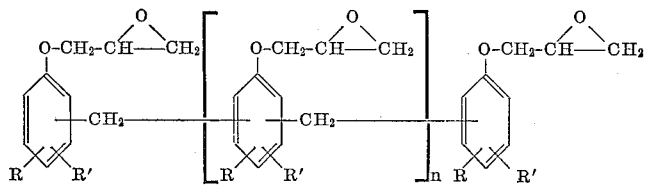

wherein $n$ has a value of from 0 to 4 and R and R' are substituents selected from hydrogen, halogen, alkyl, alkaryl, or aralkyl. It is readily prepared by reacting a novolac, having corresponding substituents to the adduct sought to be produced, with epichlorohydrin in the presence of a stoichiometric amount of aqueous NaOH at between about 50° and 150° C.

The reaction between the epoxy novolac and a halogenated phenol to prepare the adduct is represented by the equation below:

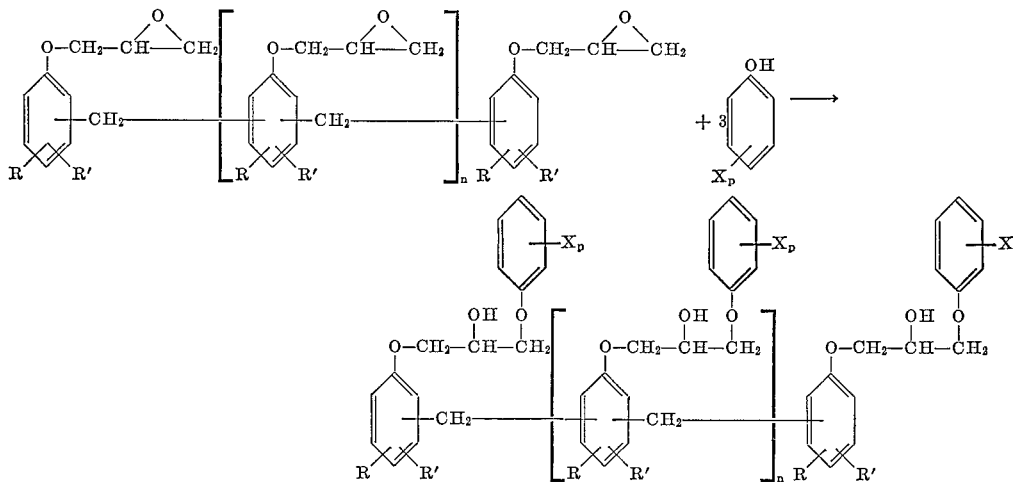

wherein R, R', and n have the designations formerly stated, X is a halogen, and p has a value of from 2 to 5 and is sufficiently large to provide enough chlorine, bromine, or both to impart self-extinguishing properties to the oleoresinous polyester subsequently prepared from it. The remaining substituents of the phenol are usually hydrogen.

In general, all adducts of polyfunctional epoxy novolacs and polyhalogenated phenols, with various modifications, which were described in and are a subject of copending patent application S.N. 149,493, filed November 2, 1961, are usable in the practice of the present invention, provided their halogen content is high enough to form fatty acid esters containing at least about 10% bromine or about 18% chlorine which will provide self-extinguishing characteristics when the coating composition in which they are used is unpigmented, or at least 6% bromine or 10% chlorine (or intermediate values when the two are present together) when the coating contains pigments, such as $Sb_2O_3$ and/or $Ca_3(PO_4)_2$, which enhance the fire-retarding effect of the halogens present.

Among the unsaturated fatty acids which are employed with the above adduct to prepare the polyester composition of the invention are: decylenic, stillingic, dodecylenic, palmitoleic, oleic, ricinoleic, linoleic, linolenic, elastoteric, gadoleic, arachidonic, erucic, selacholeic, and any combination or mixture thereof. Crude or refined fatty acids preparable from aliphatic oils such as palm oil, linseed oil, dehydrated castor oil, cottonseed oil, oiticia oil, soybean oil, tall oil, and oil derived from various fish and animal fats (e.g., the Neofats) may be used.

The self-extinguishing self-drying polyester is usually applied as a solution in a volatile vehicle, e.g., petroleum naphtha, xylene, or other substantially inert organic carrier liquid.

In the reaction between the adduct and at least one of the fatty acids, as defined above, esterification takes place between the hydroxyl and oxirane groups of the adduct on one hand, with the carboxylic groups of the fatty acid on the other hand. Thereafter, polymerization at olefinic bonds of the acid residue takes place under the influence of atmospheric oxygen and/or heat, resulting in the self-extinguishing, durable protective coating of the invention.

The following procedure is illustrative of a mode of carrying out the invention. Variations of reactants and conditions may be made, as desired, within the broader limits of the invention.

An epoxy novolac-halogenated monophenol adduct is prepared by charging a suitable reaction vessel, e.g., one provided with a means for stirring and heating and for controlling and recording temperature, with an epoxy novolac resin, as above described, and heated to between about 90° and 110° C. Thereafter, while accompanied by stirring and while being maintained substantially uniformly at this temperature, a predetermined amount of halophenol is added thereto, usually at a rate just fast enough for it to be dissolved in the epoxy novolac. At this time there is admixed with the contents of the reaction vessel an etherification catalyst, usually of a tertiary amine, such as triethylamine (preferably previously dissolved in a small amount of a solvent such as xylene) in an amount sufficient to provide between about 0.01% and 0.05% thereof, based on the weight of the reaction mixture. Because this reaction is exothermic, the temperature rises adiabatically and, if unchecked, may reach 200° or higher resulting in self-polymerization. To prevent this, cooling is applied to check the temperature at about 150° C. It is then maintained at between about 150° and 160° for about 20 to about 30 minutes. Thereafter heating is discontinued and the mixture is cooled. The adduct so made contains substantially no solvents, by-products, or other extraneous materials and is ready for esterification with fatty acids without any further treatment.

The following examples are illustrative of the practice of the invention but are not to be construed as limiting. Examples 1, 2, and 3 show the preparation and certain characteristics of the epoxy novolac-halogenated phenol adduct used in the practice of the invention. Examples 4 to 11 show the esterification of the adduct in accordance with the practice of the invention.

EXAMPLE 1

713 grams (1.25 moles) of an epoxy novolac, a commercial product sold under the designation D.E.N. 438 (having the composition represented by the formula set out hereinabove wherein n has the average value of 1.3 and R and R' were both hydrogen), were reacted, following the procedure as above described, with 504 grams (2.0 moles) of 2,4-dibromophenol in the presence of 2 cc. of 10% triethylamine solution, as catalyst. The peak temperature reached due to exothermic heat was 168° C. A resinous product began to form after about 45 minutes. The product so formed was removed from the reaction vessel and examined. It had the following properties.

Molecular wt. _____ 975
Avg. epoxy groups per molecule _____ 1.48
Avg. hydroxyl groups per molecule _____ 1.60
Esterification equivalent (based on OH calculation) 203
40% butyl Carbitol solution showed:

Viscosity _____cps__ 50
Color, Gardner _____ 2
Bromine content _____percent__ 26.3

EXAMPLE 2

Following a similar procedure to that of Example 1, 500 grams (0.877 mole) epoxy novolac, D.E.N. 438, were reacted with 374 grams (1.404 moles) of pentachlorophenol. The resulting resinous adduct thereby produced had the following properties:

| | |
|---|---|
| Molecular wt. | 1100 |
| Avg. epoxy groups per molecule | 1.6 |
| Avg. hydroxy groups per molecule | 1.9 |
| Esterification equivalent (based on OH calculation) | 216 |
| Chlorine content _____ percent | 28.9 |
| 40% butyl Carbitol solution showed: | |
| Viscosity _____ cps | 75 |
| Color, Gardner | 10 | temperature reached 200° C., and the test results obtained are set out below:

| Reaction period at between 200° and 240° C., in hours | Acid No.[1] | Viscosity in cps.[2] | Color according to the Gardner Scale [2] |
|---|---|---|---|
| 1.0 | 20.4 | 450 | 6–7 |
| 2.0 | 8.7 | 1,250 | 8 |
| 3.0 | 6 | 2,100 | 8–9 |
| 3.75 | 3.8 | 5,000 | 8–9 |
| 5.0 | 3.0 | 7,000 | 9 |

[1] Initial calculated acid number of the mixture was 87.0.
[2] Viscosity and color were determined in 70% solution of naphtha.

Additional polyesters were prepared by esterification of resinous adducts described in Examples 1, 2, and 3 using unsaturated acid mixtures. These data are summarized in Table I which follows:

Table I

| Example No. | Resin used is from Example— | Fatty acid component employed to make polyester | | Esterification cooking schedule, hrs./° C. | Final acid No. | Kind and percent of halogen |
|---|---|---|---|---|---|---|
| | | Its oil origin | Weight percent | | | |
| 5 | 1 | Linseed | 36.5 | 2.5 hrs./235° C | 4.9 | 16.7% Br. |
| 6 | 1 | D.C.O.[1] | 36.9 | 2.0 hrs./238° C | 5.9 | 16.6% Br. |
| 7 [2] | 1 | D.C.O. | 45 | 4.3 hrs./240° C | 3.2 | 14.0% Br. |
| 8 | 2 | D.C.O. | 45 | 4.1 hrs./240° C | 7.2 | 15.9% Cl. |
| 9 | 3 | Soya | 45 | 3.2 hrs./240° C | 4.1 | 12.2% Br. |
| 10 | 3 | D.C.O. | 45 | 3.5 hrs./240° C | 3.8 | 12.2% Br. |
| 11 | D.E.R. 664 [3] | D.C.O. | 45 | 4.7 hrs./245° C | 3.9 | None. |

[1] D.C.O. means dehydrated castor oil.
[2] 5% 4,4'-isopropylidenediphenol was added to the reaction mixture in this example.
[3] D.E.R. 664 is a commercial solid epoxy resin used in oleoresinous coatings; it has an epoxide equivalent weight of between 875 and 975.

EXAMPLE 3

Following a similar procedure to those in the preceding examples, 1300 grams (2.25 moles) of D.E.N. 438 were reacted with 700 grams (2.78 moles) of 2,4-dibromophenol in the presence of 0.3 gram of triethylamine to give a resin with the following characteristics:

| | |
|---|---|
| Molecular weight | 950 |
| Avg. epoxy groups per molecule | 2.0 |
| Avg. hydroxyl groups per molecule | 1.6 |
| Esterification equivalent (based on OH calculation) | 170 |
| Bromine content _____ percent | 22.2 |
| Durran melting point _____ ° C | 62 |

EXAMPLE 4

385 grams of the adduct of an epoxy novolac and 2,4'-dibromophenol, prepared as above described in Example 3, were admixed with 315 grams of castor oil fatty acids (i.e., the hydrolyzed triglycerides of dehydrated castor oil) in a 1-liter, 3-neck, round-bottom flask, provided with a stirrer, thermocouple, and a reflux condenser and equipped with a water-separating device. The resulting reaction mixture was heated with a Glas-Col electric heater. About 10 milliliters of xylene containing a few drops of an antifoam agent were also added to the mixture. The temperature of the mixture was then raised to 240° C. over a period of about 1.5 hours and maintained at that temperature for an additional 3.5 hours. It was then cooled and diluted by adding 300 grams of petroleum naphtha thereto, accompanied by stirring. During the reaction period, small amounts of the reaction mixture were withdrawn at intervals and the viscosity, color, and acid number determined. The length of time preceding each sampling, measuring from the time the After completion of esterification of the resinous adducts with unsaturated fatty acids as shown in Table I, the polyesters formed were cut to 60–70% solids with the usual oleoresinous varnish solvents (columns 2 and 3 of the Table II). Different solvents were used, their choice depending on the resinous polyester viscosity: thus, when the oil viscosity was relatively low, ordinary petroleum naphtha was used. When the viscosity was high, a high solvency aromatic diluent such as toluene or xylene was used to keep the solids content of the solution in the 60–70% range. Table II shows the solvents and amounts employed.

Table II

| Example No. | Solvent used | Percent resin total solids in solvent | Viscosity in cps. | Gardner Color Scale |
|---|---|---|---|---|
| 12 | Naphtha | 70 | 2,100 | 7 |
| 13 | do | 60 | 2,200 | 7 |
| 14 | Toluene | 70 | 1,000 | 10 |
| 15 | do | 70 | 550 | 17 |
| 16 | Naphtha | 70 | 450 | 11 |
| 17 | do | 70 | 5,000 | 8 |
| 18 | Xylene | 70 | 5,000 | 6 |

For testing oleoresinous polyester as surface coatings they were admixed with the conventional paint driers in the following proportions: 0.2% lead, 0.1% zinc, and 0.02% Co, all in the form of their naphthenate salts. For convenience of application the viscosity was further reduced to about 400 cps. by the addition of more solvent. Drying characteristics and properties of the coatings made are set out in Table III.

Table III

| Polyester used identified by Example No. from Table I | Kind and wt. percent of halogen | Time required for film to become dry to touch at room temperature in hrs. : min. | Sward Rocker Hardness [1] | 1/8" Mandrell flexibility test [2] | 2 hrs. in 5% aqueous NaOH solution | 24 hrs. in 10% acetic acid | 24 hrs. in naphtha | Fire resistance |
|---|---|---|---|---|---|---|---|---|
| 100% #6 | 16.6% Br | 1:20 | 38 | Pass | No effect | No effect | No effect | S.E. [3] |
| 100% #8 | 15.9% Cl | 1:25 | 25 | do | do | Slightly hazy [4] | do | S.E. when admixed with 2% Sb$_2$O$_3$. |
| 66% #3 and 34% #11. | 10.5% Cl | 1:20 | 30 | do | do | No effect | do | S.E. when admixed with 5% Sb$_2$O$_3$. |
| 100% #9 | 12.2% Br | 3:10 | 12 | do | Softened [5] | Slightly hazy | do | S.E. |
| 66% #9 and 34% #11. | 8.1% Br | 2:10 | 19 | do | No effect | do | do | S.E. when admixed with 2% Sb$_2$O$_3$. |
| 100% #10 | 12.2% Br | 1:25 | 29 | do | do | No effect | do | S.E. |
| 66% #10 and 34% #11. | 8.1% Br | 1:20 | 34 | do | do | do | do | S.E. when admixed with 2% Sb$_2$O$_3$. |

[1] This test is described in Physical and Chemical Examination of Paints, Varnishes, Lacquers, and Colors, 11th ed. (1950) by H. A. Gardner.
[2] This test is a modification of A.S.T.M. D1640–59, "Drying Time for Varnishes" Method A on "Dust-Free" drying time.
[3] S.E. means self-extinguishing according to A.S.T.M. Test No. D635–56T.
[4] Slightly hazy indicates a very mild attack on the resin.
[5] Softened indicates a moderate attack on the resin.

Referring to the data in Table III, the "dry to touch" time and Sward Rocker hardness were determined on 3 mil thick film cast on plate glass. For flexibility, the films were cast on a 10-mil thick tin plate. The chemical resistance was determined on the films so formed by dipping the closed end of 1" diameter test tube into the diluted varnish for a distance of about 3", draining the surplus of the liquid, and inverting the tube for 48 hours air drying at room temperature and thereafter immersing the film coated end of the tube into a test liquid for specified lengths of time.

The fire resistance tests were made essentially in accordance with the procedure of the A.S.T.M. Test D635–56T. Test samples were prepared by dipping strips of 181 type, Volan A chromate treated glass cloth into the varnish solution, evaporating the solvent therefrom, making four-ply laminate and heat-curing in a steam press.

As shown by the above described tests, results of which are summarized in Table III, in addition to being fire-resistant, all polyesters had other desirable properties normal to and characteristic of the usual synthetic oleoresinous polyesters of this type. Soya fatty acid esters were slower in drying rate, were also softer, and had somewhat poorer chemical resistance than the corresponding polyesters based on fatty acids from dehydrated castor oil. When desired, the physical properties and chemical resistance of the experimental soya oil acid polyesters of the experimental resins can be further improved by the addition of dehydrated castor oil acid polyesters of D.E.R. 664 epoxide, a well known surface coating material of excellent properties which is extensively used in electrical appliance finishes. However, since the polyester of D.E.R. 664 epoxide is not self-extinguishing, sometimes it may be desirable to enhance the self-extinguishing properties of the resulting mixture by the addition of 2–5% of Sb$_2$O$_3$ which substance exhibits synergistic fire retarding action with the halogens present in the polyesters of this invention.

Having described my invention, what I claim and desire to protect by Letters Patent is:

1. A self-extinguishing oleoresinous composition suitable for surface coatings consisting essentially of the reaction product of between about 40% and about 70% by weight of (1) the adduct formed by reacting an epoxy novolac containing between 2 and 6 phenolic nuclei with halogenated phenol and between about 60% and about 30% by weight of (2) an unsaturated fatty acid containing between about 8 and 22 carbon atoms per molecule, said halogenated phenol containing sufficient halogen substituents selected from the class consisting of bromine and chlorine to provide at least about 10% bromine when bromine is the halogen, at least about 18% chlorine when chlorine is the halogen, and a calculable intermediate value when both bromine and chlorine ring substituents are present, by weight of said oleoresinous composition.

2. The oleoresinous composition of claim 1 wherein the adduct employed is formed by reacting an epoxy novolac with brominated phenol.

3. The oleoresinous composition of claim 1 wherein the adduct employed is formed by reacting an epoxy novolac with chlorinated phenol.

4. The oleoresinous composition of claim 1 wherein the weight ratio of the adduct to the fatty acid is between about 50 and about 65 parts of the adduct and between about 50 and about 35 parts of the fatty acid.

5. The oleoresinous composition of claim 4 wherein the fatty acids are derived from vegetable oils.

6. The oleoresinous composition of claim 1 containing from 2% to 5% antimony oxide whereby the lower limit of the halogen content necessary to provide self-extinguishing characteristics is reduced to about 6% bromine, about 10% chlorine, and to a proportionate intermediate value when both are present on a phenolic nucleus of the halogenated phenol employed.

7. The oleoresinous coating composition of claim 1 containing a paint drier in an amount sufficient to effect a cure of the coating to a hard, flexible, corrosion-resistant, self-extinguishing coating on exposure to air until a substantial proportion of the olefinic bonds present in the fatty acid portion thereof become cross-linked.

8. The composition of claim 7 wherein said paint drier is selected from naphenates of lead, cobalt, manganese, and zinc and mixtures thereof and employed in an amount of between about 0.01% and 0.5% by weight of said composition.

9. A hard surface-protective coating comprising the oleoresinous composition of claim 7 which had been exposed to air as a relatively thin surface coating on the surface of an article.

References Cited by the Examiner

UNITED STATES PATENTS

| | | | |
|---|---|---|---|
| 2,600,455 | 6/1952 | Wilson. | |
| 2,610,955 | 9/1952 | De Groote et al. | 260—19 |
| 2,709,690 | 5/1955 | Narracott | 260—18 |
| 2,908,005 | 10/1959 | Greenlee | 260—19 |
| 2,909,501 | 10/1959 | Robitschek. | |
| 2,915,485 | 12/1959 | Shokal | 260—18 |
| 2,967,838 | 1/1961 | Partansky | 260—19 |
| 3,016,362 | 1/1962 | Wismer | 260—47 |
| 3,023,178 | 2/1962 | Greenlee et al. | 260—18 |
| 3,058,946 | 10/1962 | Nametz | 260—47 |

FOREIGN PATENTS 572,822 10/1945 Great Britain.

LEON J. BERCOVITZ, *Primary Examiner*.